(12) United States Patent
Bhella et al.

(10) Patent No.: US 11,734,530 B1
(45) Date of Patent: Aug. 22, 2023

(54) SYSTEMS AND METHODS FOR SCANNER CONFIGURATION BASED ON FOCUS OF ONE OR MORE HOST APPLICATION SCREENS

(71) Applicant: ZEBRA TECHNOLOGIES CORPORATION, Lincolnshire, IL (US)

(72) Inventors: Kenneth S. Bhella, Stony Brook, NY (US); Viraj Jeevan Thameera Amarasekera, Kadawatha (LK)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/692,798

(22) Filed: Mar. 11, 2022

(51) Int. Cl.
*G06K 7/10* (2006.01)

(52) U.S. Cl.
CPC ...... *G06K 7/10811* (2013.01); *G06K 7/10722* (2013.01); *G06K 7/10821* (2013.01); *G06K 7/10861* (2013.01)

(58) Field of Classification Search
CPC .............. G06K 7/10722; G06K 7/10821
USPC ............................. 235/462.22, 435
See application file for complete search history.

(56) References Cited

U.S. PATENT DOCUMENTS

2002/0026495 A1\* 2/2002 Arteaga .................. G06F 9/542
709/217

\* cited by examiner

*Primary Examiner* — Toan C Ly
(74) *Attorney, Agent, or Firm* — Yuri Astvatsaturov

(57) ABSTRACT

Systems and methods are described for implementing scanner configuration based on focus of one or more host application screens. Example systems and methods comprise detecting a focus event of an application (app) as executing on one or more processors. An active focus module (AFM) detects the focus event. The AFM or a scanner device is configured to receive data in a first data app format. Scan data is scanned by the scanner device and is formatted, at the AFM or at the scanner device, into app data having the data app format. The app data is then provided to the app.

16 Claims, 5 Drawing Sheets

SYSTEMS AND METHODS FOR SCANNER CONFIGURATION BASED ON FOCUS OF ONE OR MORE HOST APPLICATION SCREENS

BACKGROUND

Currently, specific software applications (apps) can require multiple, dedicated scanners for technical and compatibility reasons. For example, a given software application may be configured to recognize scanning from a certain scanner that uses a specific communication or data type specific to that that application. For example, some applications have different features, requiring different command key(s) to finish a scanning procedure. Also, each scanner may have different protocol for each cable or communication path. Such software applications and scanners are typically fixed in a proprietary manner when they are initially setup or installed.

A problem arises, however, when a given scanner needs to be changed or updated, as the scanner and/or its related system typically require manual alterations of a technician or other skilled person in order to differently configure the scanner with new or different protocols, data communications, and/or other features desired or needed for a given application, where the given application may be a new or different application, or a different or new screen of the same application.

Accordingly, there is a need for systems and methods for implementing scanner configuration based on focus of one or more host application screens, as described herein.

SUMMARY

In one aspect, the present disclosure describes a system configured to implement scanner configuration based on focus of one or more host application screens. The system may comprise a scanner device, one or more processors, and a memory communicatively coupled to the one or more processors. The system may further comprise an active focus module (AFM) stored in the memory and accessible by the one or more processors and configured to detect focus events from one or more applications (apps). The system may further comprise computing instructions that when executed by the one or more processors, may cause the one or more processors to detect by the AFM a first focus event of a first app as executing on the one or more processors, wherein the AFM or the scanner device is configured to receive data in a first data app format. The computing instructions, when executed, may further cause the one or more processors to scan first scan data by the scanner device. The computing instructions, when executed, may further cause the one or more processors to format, at the AFM or at the scanner device, the first scan data into first app data having the first data app format. The computing instructions, when executed, may further cause the one or more processors to provide, to the first app, the first app data.

In an additional aspect, a method is disclosed for implementing scanner configuration based on focus of one or more host application screens. In various aspects, the method may comprise detecting a first focus event of a first app as executing on one or more processors, wherein an active focus module (AFM) detects the first focus event, and wherein the AFM or a scanner device is configured to receive data in a first data app format. The method may further comprise scanning first scan data by the scanner device. The method may further comprise formatting, at the AFM or at the scanner device, the first scan data into first app data having the first data app format. The method may further comprise providing, to the first app, the first app data.

In a still further aspect, a tangible, non-transitory computer-readable medium storing computing instructions for implementing scanner configuration based on focus of one or more host application screens is disclosed. The computing instructions, when executed by one or more processors, may cause the one or more processors to detect a first focus event of a first app as executing on the one or more processors, wherein an active focus module (AFM) detects the first focus event, and wherein the AFM or a scanner device is configured to receive data in a first data app format. The computing instructions, when executed by one or more processors, may further cause the one or more processors to scan first scan data by the scanner device. The computing instructions, when executed by one or more processors, may further cause the one or more processors to format, at the AFM or at the scanner device, the first scan data into first app data having the first data app format. The computing instructions, when executed by one or more processors, may further cause the one or more processors to provide, to the first app, the first app data.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate aspects of concepts that include the claimed invention, and explain various principles and advantages of those aspects.

Figure 1:
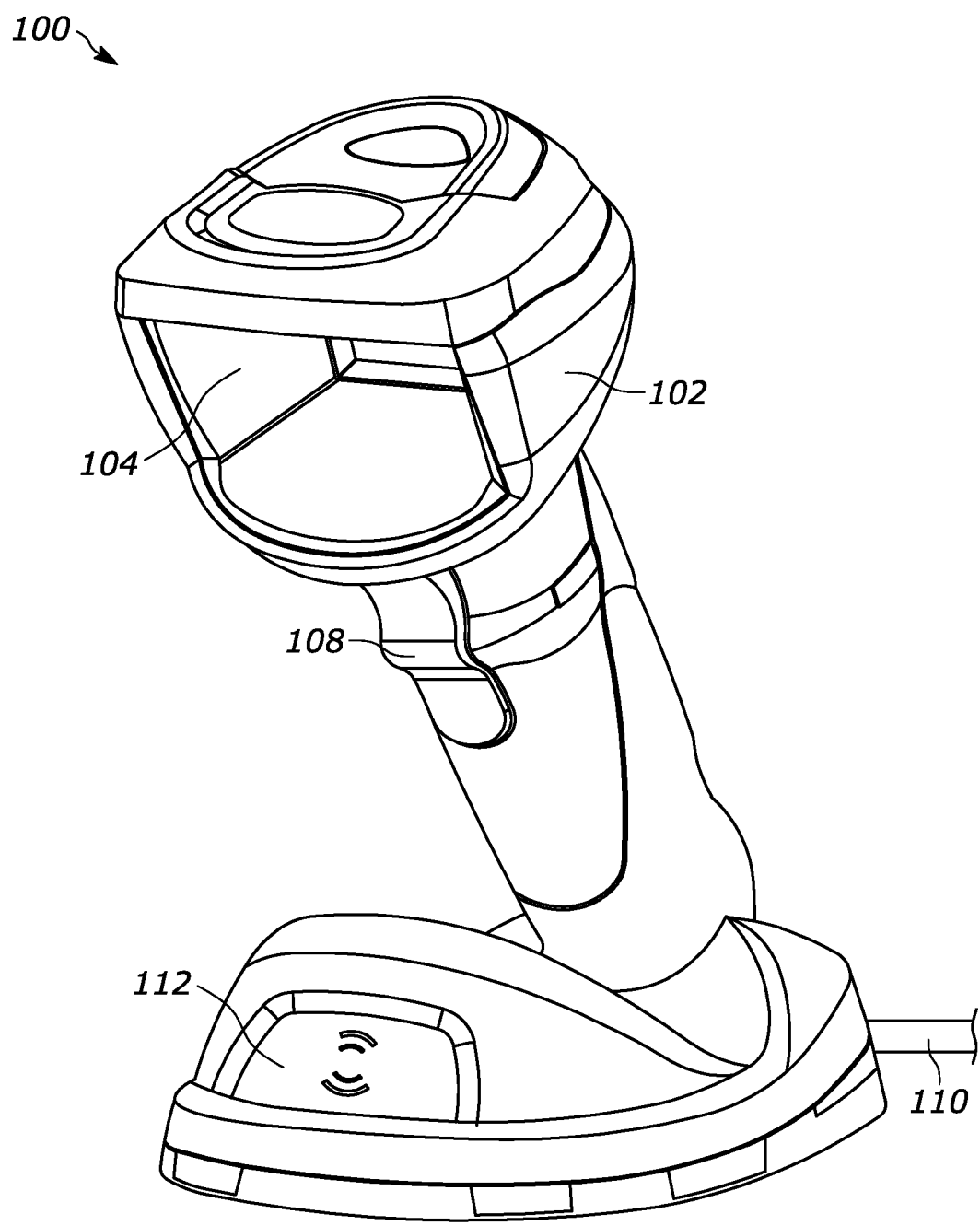
FIG. 1 illustrates a perspective view of an example scanner device in accordance with various embodiments disclosed herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of aspects of the present invention.

The apparatus and method components have been represented where appropriate by conventional symbols in the drawings, showing only those specific details that are pertinent to understanding the aspects of the present invention so as not to obscure the disclosure with details that will be readily apparent to those of ordinary skill in the art having the benefit of the description herein.

DETAILED DESCRIPTION

The present disclosure refers to, in various aspects, an Active Focus Module (AFM), which is software code or computer instructions. While the term "module" is used to describe the AFM, it is to be understood that the AFM that can be implemented in a variety of different software forms or formats such as a software program, software application (app), module, driver, daemon, script, and/or other such software or computing instructions. In various aspects, the AFM can be implemented as an always running or always executing software app or module, and, in some aspects, can begin running or executing on startup of a host system or device, for example, as described for FIG. 6 herein. Additionally, or alternatively, the AFM can be part of a driver, service, or daemon software or routine. By way of non-limiting example CORESCANNER software or driver, as provided by ZEBRA TECHNOLOGIES CORPORATION, can comprise an AFM. Generally, CORESCANNER software is a Windows service and a Linux daemon that enables the communication between a scanner and an application created with respective Windows and Linux software development kit (SDK)s. It should be understood that the AFM and CORESCANNER software can be implemented in a same software layer, or, in the alternative, can be implemented as different software layers in direct or indirect communication which each other.

Figure 3:
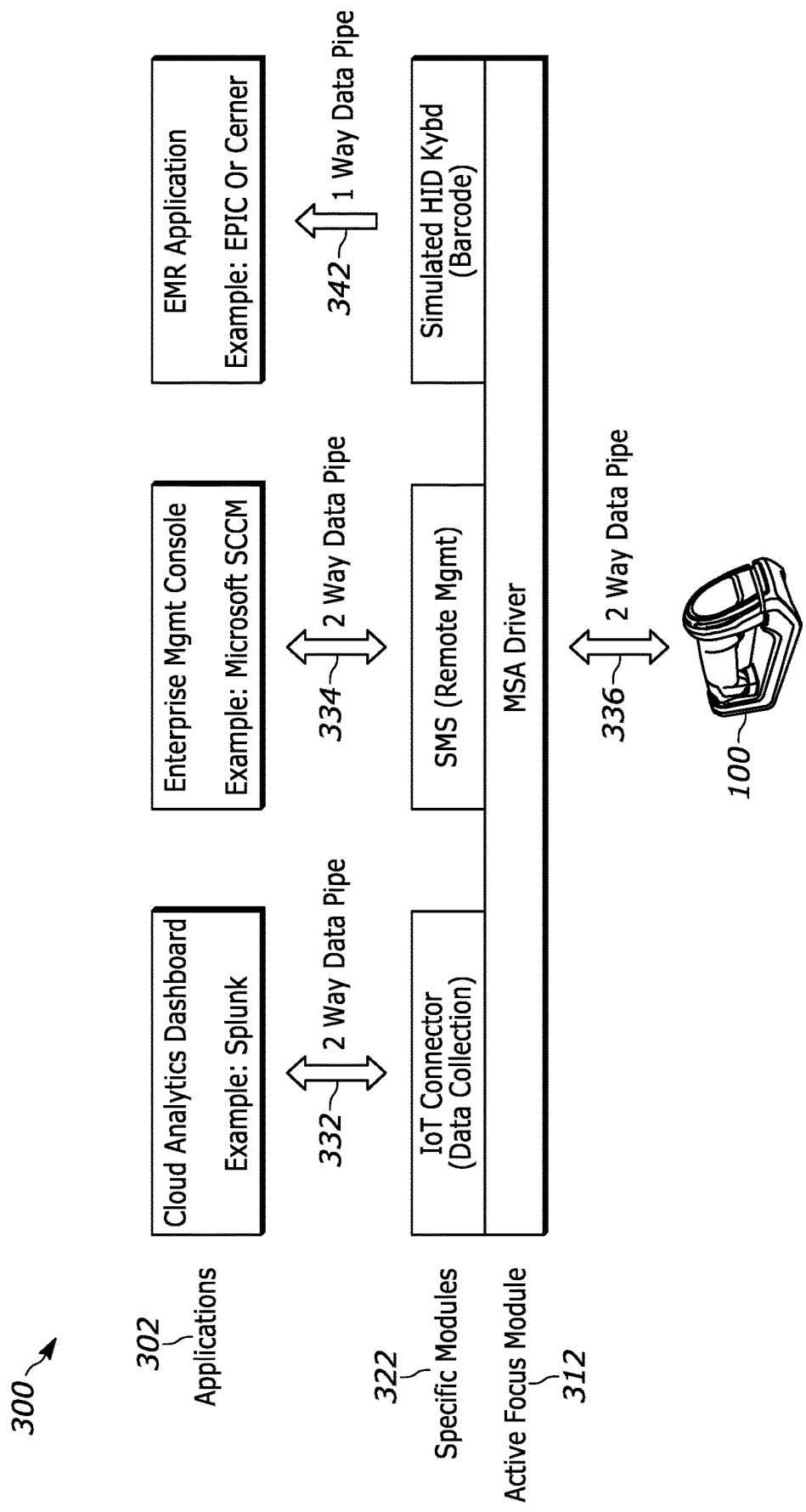
FIG. 3 depicts an example system configured to implement scanner configuration based on focus of one or more host application screens, in accordance with aspects described herein.

In various aspects, the AFM is configured to monitor a host system (e.g., a host computer, such as a personal computer or otherwise a computer system as shown herein by, e.g., FIGS. 3 and/or 6) to detect or otherwise find a currently focused display, window, or screen. In various aspects, this may be accomplished by detecting an active or focused screen by monitoring the application and screen names. For example, the AFM may detect, read, or otherwise find which app screen is open or active on the host computer. The AFM may then configure a communication protocol for the given scanner. Further examples and aspects of the methods and systems are described herein below.

More generally, the AFM allows a scanner device (e.g., scanner device 100 as described for FIG. 1 herein) to always to remain online, where, for example, a user need not reboot the scanner to change modes or operation of the scanner. This improves over existing scanners as rebooting of a scanner causes loss of communication to and from the scanner, which reduces the operation or uptime of the underlying host computing device that relies on the scanner.

FIG. 1 illustrates a perspective view of an example scanner device 100 in accordance with various embodiments disclosed herein. Scanner device 100 may also be referred to herein as a "scanning device" or simply a "scanner." Further, the scanner device may comprise, in various aspects, a barcode scanner, an RFID reader, and/or otherwise a data input device for scanning or reading scan data as described herein.

Scanner device 100 includes an optical imaging assembly 102, with a scanning window 104. Optical imaging assembly 102 may include an image sensor that may include a plurality of photo-sensitive elements. The photo-sensitive elements may be arranged in a pattern and may form a substantially flat surface. For example, the photo-sensitive elements may be arranged in a grid or a series of arrays forming a 2D surface. The image sensor of the optical imaging assembly 102 may have an imaging axis that extends through scanning window 104 for the purpose of capturing or scanning scan data, e.g., such as 1D or 2D images which may comprise barcodes, QR codes, or the like.

The optical imaging assembly 102 may have an effective reading range defined by the image sensor, e.g., where the effective reading range may correspond to the physical range of the laser or other optical wavelength projected by the image sensor. The optical imaging assembly 102 may also have an optical field of view (FOV) defined by the image sensor and fitting the scanning window 104. For example, the optical FOV may be shaped by the effective reading range of the image sensor and be configured to extend through the opening defined by the scanning window 104. In certain embodiments, the imaging axis of the image sensor may be coaxial with the optical FOV, where each may extend through scanning window 104.

In example aspect of FIG. 1, scanner device 100 also comprises an RFID reader 112. RFID reader 112 includes an RFID radio antenna configured to emit an RFID based radiation pattern (e.g., a radio frequency RF field of view). In certain modes, the RFID reader 112 may operate to automatically read RFID tags within the radiation pattern emitted by RFID reader 112. In some embodiments, the RFID reader may be an ultra-high frequency (UHF) RFID reader.

Scanner device 100 further includes trigger 108. In some embodiments, trigger 108 may activate each of the optical imaging assembly 102 and the RFID reader 112 together. In other embodiments, trigger 108 may be configured to activate, at least initially, one of the optical imaging assembly 102 or the RFID reader 112 where, for example, a top portion of trigger 108 activates the optical imaging assembly 102 and a bottom portion of trigger 108 activates the RFID reader 112, or vice versa. It is to be understood however, that activation of the optical imaging assembly 102 and/or the RFID reader 112 need not occur solely through trigger 108, and that scanner device 100 may also operate in a "hands-free" mode where activation of the optical imaging assembly 102 and/or the RFID reader 112 may occur upon the detection of products in the vicinity, field of view, effective reading range, etc. of scanner device 100.

In various aspects, activation of the optical imaging assembly 102, e.g., via trigger 108, may cause the optical imaging assembly 102 to capture scan data (e.g., image data or information). Such scan data or information may include, for example, product codes (e.g., barcodes or QR codes) associated with corresponding products. In other embodiments, the data or information may include signature information or data.

Similarly, activation of the RFID reader 112, e.g., via trigger 108, may cause the RFID reader 112 to capture tag data or other such information. Such tag data or other information may be encoded, for example, on one or more RFID tags associated with one or more corresponding products.

The data or information captured from either the optical imaging assembly 102 and/or the RFID reader 112 may be transmitted to a host computer (e.g., such as a host personal computer (PC)), servers, or other processing devices (e.g., the systems of FIGS. 3 and/or 6) for a variety of purposes including, e.g., for implementing scanner configuration based on the focus of one or more host application screens. Scanner device 100 includes a cabling interface 110 for transmission of such data or information, which may include an interface for connecting to an input/output (I/O) interface (e.g., I/O interface 608) a computer system. In various embodiments, scanner device may support several data transmission interfaces including, for example, USB, Standard RS-232, IBM 468X/469X, Simple Serial Interface (SSI), or other similar data transmission interfaces standards.

Figure 6:
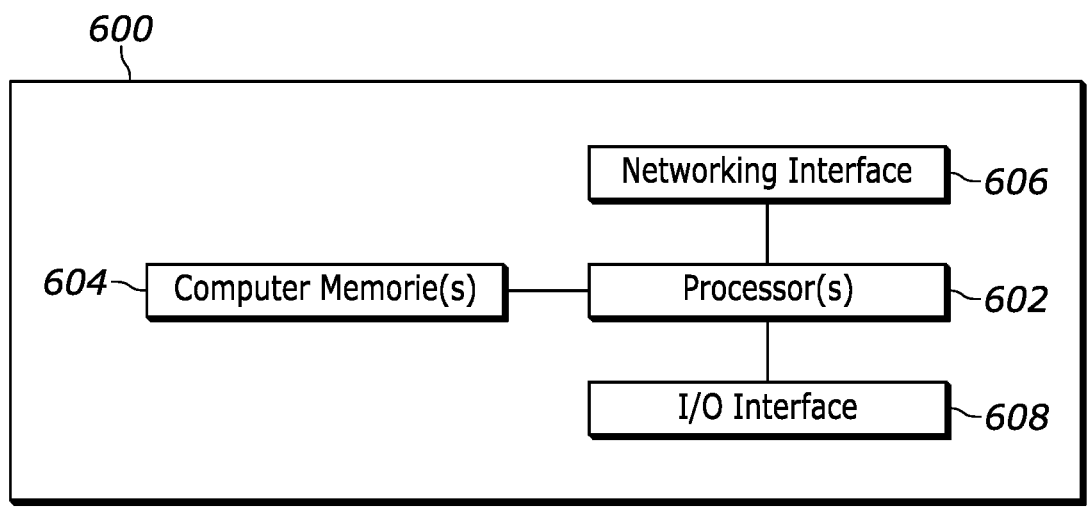
FIG. 6 is a block diagram representative of an example logic circuit capable of implementing one or more components of the example systems and methods for implementing scanner configuration based on focus of one or more host application screens, as described herein.

Scanner device 100 may also include a processor (e.g., one processor of processor(s) 602 of FIG. 6) for implementing scanner configuration based on the focus of one or more host application screens as described herein.

Figure 2:
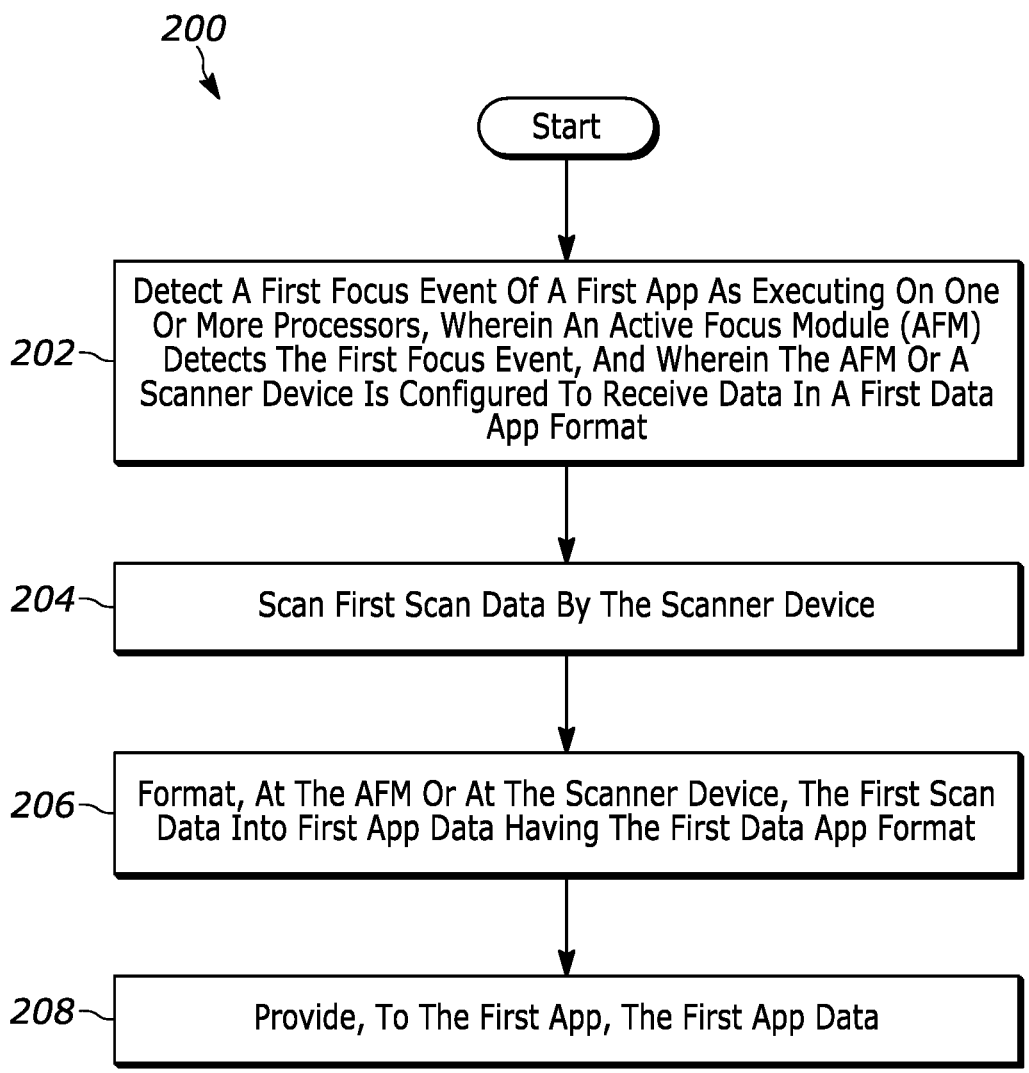
FIG. 2 is an example method for implementing scanner configuration based on focus of one or more host application screens, in accordance with aspects described herein.

FIG. 2 is an example method 200 for implementing scanner configuration based on focus of one or more host application screens, in accordance with aspects described herein. At block 202, method 200 comprises detecting a first focus event of a first application (app) as executing on one or more processors (e.g., processor(s) 602 of FIG. 6). In various aspects, the first focus event is a display based event of a first graphic user interface (GUI) associated with the first app. For example, the first focus event may comprise when a user clicks on, or hovers over, an application window of the first app (e.g., a host application screen). The focus event can occur when switching between two screens of a same app, for example, as demonstrated further herein for FIG. 4. Additionally, or alternatively, the focus event can occur when switching between two screens of two different applications, for example, as demonstrated further herein for FIG. 5. In various aspects, an active focus module (AFM) detects the first focus event, the AFM or a scanner device (e.g., scanner device 100) is configured to receive data in a first data app format.

At block 204, method 200 further comprises scanning first scan data by the scanner device.

At block 206, method 200 further comprises formatting, at the AFM or at the scanner device, the first scan data into first app data having the first data app format.

At block 208, method 200 further comprises providing, to the first app, the first app data. Further example systems and methods, which may be a part of, or in addition to, method 300, are provided herein, such the examples of FIGS. 3-5 below.

FIG. 3 depicts an example system 300 configured to implement scanner configuration based on focus of one or more host application screens, in accordance with aspects described herein. The scanner system 300 may include a scanner device (e.g., scanner device 100 as described herein for FIG. 1). System 300 may further comprise one or more processors (e.g., processor(s) 602 as shown for FIG. 6). In addition, system 300 may further comprise one or more memories (e.g., memorie(s) 604 as shown for FIG. 6), which may be communicatively coupled to the one or more processors.

System 300 may further include an AFM, e.g., AFM 312 which is implemented as an MSA driver (e.g., a software driver). The AFM (e.g., AFM 312) may be stored in the memory (e.g., memorie(s) 604) and be accessible by the one or more processors (e.g., processor(s) 602).

Figure 4:
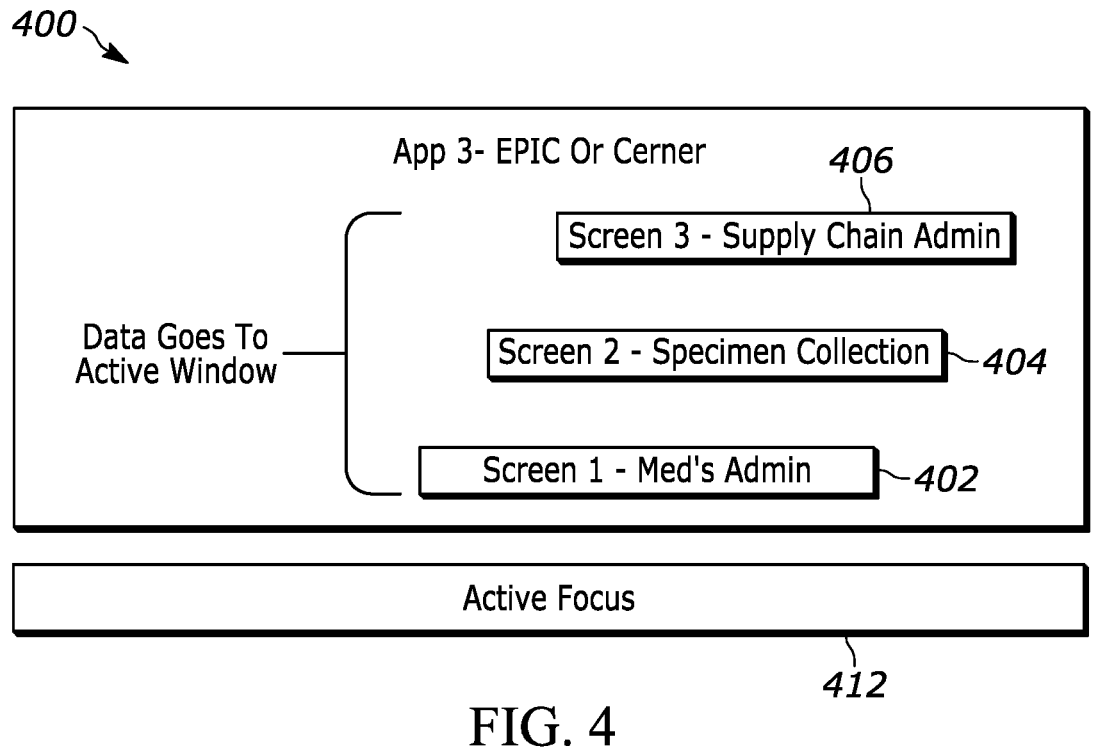
FIG. 4 is an example interaction of a plurality of application screens in communication with a single application, in accordance with aspects described herein.
Figure 5:
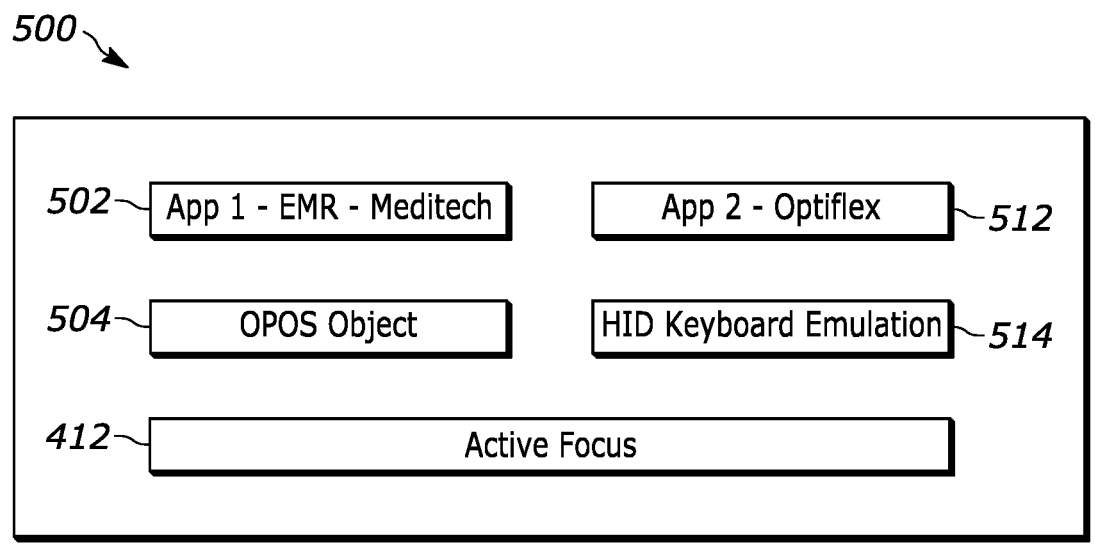
FIG. 5 is an example interaction of a plurality of application screens in communication with a plurality of applications, in accordance with aspects described herein.

The AFM is configured to detect focus events from one or more applications (apps), for example, as described herein for FIGS. 2, 4, 5, and/or elsewhere herein. As shown in the example of FIG. 3, three applications 302 are shown. Applications 302 are software applications including, for example, a cloud analytics dashboard (e.g., the SPLUNK application, an Enterprise Management Console Application (e.g., the Microsoft SCCM application), and an EMR Application (e.g., the EPIC or CERNER application(s)). It should be understood that applications 302 are examples and that different, fewer, and/or additional applications may also be used with the systems and methods described herein.

Each of the applications 302 communicates to one of the specific modules 322. The specific modules 322 are configured for communication in a format and/or communication protocol expected or set (e.g., via an application programming interface (API)) for the respective application of applications 322. In addition, communication may be configured as either one-way or two-way communication (e.g., one-way or two-way data pipe), where two-way communication allows transmission of data to and from an application and a specific module (and ultimately scanner device 100), and one-way communication involves communication in one direction (e.g., from the specific module to the application or vice versa, and ultimately the scanner device 100 in the given direction).

As shown in the example of FIG. 3, the cloud analytics application implements 2-way communication 322 between an Internet-of-Things (IoT) connector for data collection to and from the cloud analytics application and the scanner device 100, as facilitated by the MSA driver (i.e., the AFM). As a further example, the Enterprise Management Console application implements 2-way communication 334 between a short message service (SMS) module for remote management to and from the Enterprise management Console and the scanner device 100, as facilitated by the MSA driver (i.e., the AFM). As yet a further example, the EMR application implements 1-way communication 342 between a simulated HID keyboard module for data collection from the scanner device 100 to the EMR application, as facilitated by the MSA.

As a specific example, the EMR Application may traditionally use HID complaint keyboard data or protocols only. This is because HID is a high level or otherwise common format or protocol used for various use cases in which HID keyboard data is commonly used. In such example, an AFM (e.g. here the MSA driver, i.e., the AFM 312) can be configured to work with a simulated HID keyboard module (of the specific modules 322), where AFM 312 translates scanner data (e.g., as scanned from scanner 101) to HID keyboard data for use with the EMR application.

In various aspects, computing instructions may be executed by the one or more processors (e.g., processor(s) 602) to cause the one or more processors to configure the scanner device (e.g., scanner device 100) to operate according to an updated configuration when the first focus event is detected. For example, such configuration may include where the AFM is configured as a two-way or one-way data pipe to facilitate data exchange to and/or from the scanner device (e.g., scanner device 100) and the app (e.g., a first app such as the cloud analytics app). In some aspects, two-way communication may be available even if a host application is a legacy one-way communication based application (e.g., legacy HID Keyboard application).

Additionally, or alternatively, some applications use direct data from scanner to application directly (e.g., USB to a scanner device directly) (not shown). The computing instructions may update the scanner device (e.g., scanner device 100) by causing the AFM to read data entered for the app (e.g., first app), format the first entered data into scanner configuration data, and update the scanner device based on the scanner configuration data. The scanner may be configured to output data in a format according to the scanner configuration data. In this way, the AFM enables data collection without necessarily configuring the host app.

Each of the specific modules 322 are configured to communicate with AFM 312, where the AFM 312 provides a universal or common interface for communication to and from the scanner device (e.g., scanner device 100) and the specific modules 322, and, thus, to and from the applications 302. For example, in various aspects, scan data (e.g., first scan data of a first app) may be electronically transmitted in a communication protocol, where first scan data is formatted into a data app format (e.g., a first data app format) as provided from a device driver or the AFM 312.

As shown, AFM 312 implements two-way communication 336 between the scanner device 100 to facilitate scan data to be sent to the applications 322 on the one hand, and the scanner device 100 to be updated or configured by the applications 322 on the other hand.

More generally, the Active Focus Module (AFM) enables a scanner device (e.g., scanner device 100) to be used across multiple screens within an application or multiple applications, one screen (e.g., one use case) at a time. The AFM automates monitoring which application screen is currently in use or has focus, and configures the scanner device (e.g., scanner device 100) to handle the data input needs of the application screen. That is, the AFM enables a customer to scan data into multiple screens of an application or multiple applications with no special user operations other than clicking on the screen, hovering over the screen, and/or any other activity to change screen focus as described herein. For example, such configuration can include which form fields of a display screen to input scan data into.

In various aspects, the AFM can detect which operating system the application (app) running on to configure the data format or protocol for that given operating system. The AFM may monitor events of operating system to detect active focus or switching between app screens. The operating systems may include, by non-limiting example, any one or more of e.g., a MICROSOFT WINDOWS operating system, an APPLE operating system, a LINUX operating system, a UNIX operating system, a mobile operating system, or the like.

In various aspects, app data (e.g., first app data) may be entered, loaded, and/or prepopulated into one or more form fields of an app (e.g., a first app). This allows automated data scanning entry into one or more input field(s) on the screen. For example, in various aspects, and as described elsewhere herein, an event comprises a user clicking into an application window or hovering over an application window. Upon focus of the event on an application (e.g., on the app window), scan data may be routed to specific input screen with entry fields (e.g., form fields of app window or a form field 7 of a given display screen). In some aspects, after entering form field data, a need to hit command key (e.g., enter key, tab key, or similar terminal key) may be needed, and the AFM may be configured to implement the command key entry despite any specific key entry required by a legacy module or otherwise application (e.g., specific module 322).

In still further aspects, based on the focus details of a given application (e.g., any of applications 302), the AFM may configure the scanner (e.g., scanner device 100) and associated software (SDK components such as specific modules 322). The AFM can be configured to operate with multiple applications (e.g., based on exact application name match or wildcard match) and set up multiple configurations. Some possible configurations include: configuring for data formatting per application (e.g., as shown for FIG. 4 herein); operating between management protocols and HID keyboard emulation (e.g., as shown for FIG. 5 herein); configuring for automated data scanning entry into the appropriate input field on the screen; changing scanner configurations such as enabling and/or disable barcode types based on active application; changing scanner LED color and/or audible (beep) scanner noise for user notification; and/or disabling or enabling barcode scanner operation based on the active application. In some aspects, the drivers of the scanner device (e.g., scanner device 100) itself may also be configured.

FIG. 4 is an example interaction of a plurality of application screens (application screens 402-406) in communication with a single application (e.g., application 400), in accordance with aspects described herein. The example of FIG. 4 shows a single app 400 (e.g., the EPIC or Cerner app of applications 302 of FIG. 3). Single app 400 comprises multiple screens (e.g., medical admin screen 402, specimen collection screen 404, and supply chain admit screen 406).

In the configuration of FIG. 4, AFM 412 is configured to provide data formatting or communication on a per screen basis. For example, each screen (e.g., of screens 402-406) may need different data formatting and may require a different terminal key e.g., enter key, tab key, or the like. The description for AFM 312 of FIG. 3 applies herein for AFM 412. For example, AFM 412 AFM automates data entry into application 400's active window or screen (e.g., any one or more of screens 402-406). Upon clicking in, or hovering over application 400, scanned data can routed to a specific entry field on a given screen (e.g., any one or more of screens 402-406). The AFM 412 enables data formatting to meet the needs of the given screen. For example, data may be formatted by the AFM to meet form fields of a given screen and may be transmitted to that screen (i.e., the active screen) when the scanner device is activated to scan data. Data formatting may include formatting information of a barcode (e.g., a UPC number) into a certain number of digits with required whitespace and/or delimiter characters and/or text.

FIG. 5 is an example interaction of a plurality of application screens in communication with a plurality of applications (e.g., application 502 and application 512), in accordance with aspects described herein. In particular, FIG. 5 shows application 502 as a first application (e.g., the EMR application of the applications 302 of FIG. 3). FIG. 5 further shows a second application 512 (e.g., an OPTIFLEX application). Each application communicates with a separate module. As shown, application 502 communicates with an OPOS object module 504 and application 512 communicates with an HID Keyboard emulation module 514, which are modules configured in the same or similar manner as described herein for specific modules 322.

Further, as shown, OPOS object module 504 and HID Keyboard emulation module 514 communicate with AFM 412. The description for AFM 312 of FIG. 3 and AFM 412 applies herein for AFM 412 of FIG. 5. AFM 412 communicates with a scanner device (e.g., scanner device 100) for data formatting and interface communication as described herein. In this way, FIG. 5 illustrates multiple apps with AFM 412 working between different data formats and/or communication protocols e.g., management protocol (e.g., OPOS) and HID Keyboard Emulation.

In the example of FIG. 5, computing instructions are configured to execute on one or more processors (e.g., processor(s) 602) to detect a second focus event (e.g., a focus event focusing a second app). For example, a user may select or focus (e.g., with a mouse, keypad, touch screen, or other input device) a different screen or GUI of a second application of a second app. This may comprise a use focusing off of a screen of application 502 and into a screen of second application 512.

When a focus event occurs, AFM 412, or the scanner device itself, is configured to receive data in a second data app format (e.g., in a data format and/or communication protocol of the second application 512, which, in the example of FIG. 5, is the HID keyboard communication data format and/or communication protocol). In this way an application change and/or data format change occurs upon the focus event, where at least one of: (a) the first app is different from the second app; or (b) the first data app format is different from the second data app format.

Once configured, the scanner device may then scan second data, and the AFM 412 or the scanner device itself may format the second scan data into second app data having the second data app format, e.g., for second application 512. The AFM may then provide, to the second app (e.g., second app 512), the second app data, e.g., for populating one or more form fields of a screen of the second application.

FIG. 6 is a block diagram representative of an example logic circuit capable of implementing one or more components of the example systems and methods for implementing scanner configuration based on focus of one or more host application screens, as described herein. The example logic circuit of FIG. 6 is a processing platform 600 (e.g., a host computer and/or scanner device comprises one or more processors and one or more memories) capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 600 of FIG. 6 includes one or more processor(s) 602 such as, for example, one or more microprocessors, controllers, and/or any suitable type of processor. The example processing platform 600 of FIG. 6 includes one or more memories (e.g., volatile memory, non-volatile memory) 604 accessible by the one or more processor(s) 602 (e.g., via a memory controller). The example processor(s) 602 interact with the memorie(s) 604 to obtain, for example, machine-readable instructions stored in the memorie(s) 604 corresponding to, for example, the operations represented by the flowcharts of this disclosure. Additionally or alternatively, machine-readable instructions corresponding to the example operations described herein may be stored on one or more removable media (e.g., a compact disc, a digital versatile disc, removable flash memory, etc.) that may be coupled to the processing platform 600 to provide access to the machine-readable instructions stored thereon.

The example processing platform 600 of FIG. 6 also includes a network interface 606 to enable communication with other machines via, for example, one or more networks. The example network interface 606 includes any suitable type of communication interface(s) (e.g., wired and/or wireless interfaces) configured to operate in accordance with any suitable protocol(s).

The example, processing platform 600 of FIG. 6 also includes input/output (I/O) interfaces 608 to enable receipt of user input and communication of output data to a scanner device (e.g., scanner device 100) and/or to a user via a user input/output interface (e.g., a keypad, keyboard, touchpad, button interface, display, or user feedback).

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A system configured to implement scanner configuration based on focus of one or more host application screens, the system comprising:
   a scanner device;
   one or more processors;
   a memory communicatively coupled to the one or more processors;
   an active focus module (AFM) stored in the memory and accessible by the one or more processors and configured to detect focus events from one or more applications (apps); and
   computing instructions that when executed by the one or more processors, cause the one or more processors to:
      detect by the AFM a first focus event of a first app as executing on the one or more processors, wherein the AFM or the scanner device is configured to receive data in a first data app format,
      scan first scan data by the scanner device,
      format, at the AFM or at the scanner device, the first scan data into first app data having the first data app format, and
      provide, to the first app, the first app data.

2. The system of claim 1, wherein the computing instructions when executed by the one or more processors, further cause the one or more processors to:
   detect a second focus event of a second app as executing on the one or more processors, wherein the AFM or the scanner device is configured to receive data in a second data app format, and wherein at least one of: (a) the first app is different from the second app; or (b) the first data app format is different from the second data app format,
   scan second scan data by the scanner device,
   format, at the AFM or at the scanner device, the second scan data into second app data having the second data app format, and
   provide, to the second app, the second app data.

3. The system of claim 1, wherein the first scan data is electronically transmitted in a communication protocol, and wherein the first scan data is formatted into the first data app format as provided from a first device driver or the AFM.

4. The system of claim 1, wherein the first app data is entered into one or more form fields of the first app.

5. The system of claim 1, wherein the computing instructions that when executed by the one or more processors, further cause the one or more processors to:
   configure the scanner device to operate according to an updated configuration when the first focus event is detected.

6. The system of claim 1, wherein the AFM is configured as a two-way data pipe to facilitate data exchange to and from the scanner device and the first app, and
   wherein the computing instructions that when executed by the one or more processors, cause the one or more processors to:

read, by the AFM, first entered data from the first app,
format the first entered data into scanner configuration
data, and
update the scanner device based on the scanner configuration data, wherein the scanner is configured to output data in a format according to the scanner configuration data.

7. The system of claim 1, wherein the scanner device is a barcode scanner, an RFID reader, or a data input device.

8. The system of claim 1, wherein the first focus event is a display based event of a first graphic user interface (GUI) associated with the first app.

9. A method for implementing scanner configuration based on focus of one or more host application screens, the method comprising:
detecting a first focus event of a first app as executing on one or more processors, wherein an active focus module (AFM) detects the first focus event, and wherein the AFM or a scanner device is configured to receive data in a first data app format;
scanning first scan data by the scanner device;
formatting, at the AFM or at the scanner device, the first scan data into first app data having the first data app format; and
providing, to the first app, the first app data.

10. The method of claim 9 further comprising:
detecting a second focus event of a second app as executing on the one or more processors, wherein the AFM or the scanner device is configured to receive data in a second data app format, and wherein at least one of: (a) the first app is different from the second app; or (b) the first data app format is different from the second data app format;
scanning second scan data by the scanner device;
formatting, at the AFM or at the scanner device, the second scan data into second app data having the second data app format; and
providing, to the second app, the second app data.

11. The method of claim 9, wherein the first scan data is electronically transmitted in a communication protocol, and wherein the first scan data is formatted into the first data app format as provided from a first device driver or the AFM.

12. The method of claim 9, wherein the first app data is entered into one or more form fields of the first app.

13. The method of claim 9 further comprising:
configuring the scanner device to operate according to an updated configuration when the first focus event is detected.

14. The method of claim 9 further comprising:
reading, by the AFM, first entered data from the first app, wherein the AFM is configured as a two-way data pipe to facilitate data exchange to and from the scanner device and the first app;
formatting the first entered data into scanner configuration data; and
updating the scanner device based on the scanner configuration data, wherein the scanner is configured to output data in a format according to the scanner configuration data.

15. The method of claim 9, wherein the scanner device is a barcode scanner, an RFID reader, or a data input device.

16. A tangible, non-transitory computer-readable medium storing instructions for implementing scanner configuration based on focus of one or more host application screens, that when executed by one or more processors, cause the one or more processors to:
detect a first focus event of a first app as executing on one or more processors, wherein an active focus module (AFM) detects the first focus event, and wherein the AFM or a scanner device is configured to receive data in a first data app format,
scan first scan data by the scanner device,
format, at the AFM or at the scanner device, the first scan data into first app data having the first data app format, and
provide, to the first app, the first app data.

* * * * *